US011976805B1

(12) United States Patent
Lin

(10) Patent No.: US 11,976,805 B1
(45) Date of Patent: May 7, 2024

(54) CONNECTION STRUCTURE OF LED WALL LAMP HAVING HIDDEN SWITCH

(71) Applicant: Giantech Industries Co., Ltd., Taichung (TW)

(72) Inventor: Chih-Cheng Lin, Taichung (TW)

(73) Assignee: Giantech Industries Co., Ltd., Taichung (TW)

( * ) Notice: Subject to any disclaimer, the term of this patent is extended or adjusted under 35 U.S.C. 154(b) by 0 days.

(21) Appl. No.: 18/452,217

(22) Filed: Aug. 18, 2023

(51) Int. Cl.
*F21V 21/04* (2006.01)
*F21V 1/10* (2006.01)
*F21V 21/002* (2006.01)
*F21V 23/04* (2006.01)

(52) U.S. Cl.
CPC .............. *F21V 21/047* (2013.01); *F21V 1/10* (2013.01); *F21V 21/002* (2013.01); *F21V 23/04* (2013.01)

(58) Field of Classification Search
CPC ...... F21V 21/047; F21V 21/002; F21V 23/04; F21V 1/10
See application file for complete search history.

(56) References Cited

U.S. PATENT DOCUMENTS 524,706 A * 8/1894 Connell .................. F21V 23/04 439/11
3,238,366 A * 3/1966 Schwartz ................ F21V 21/26 362/282
2009/0040774 A1* 2/2009 Avila ...................... F21S 8/036 362/371
2013/0322100 A1* 12/2013 Lowry .................... F21V 21/26 362/427
2015/0049513 A1* 2/2015 Haubach ................... F21S 8/04 362/648
2021/0262644 A1* 8/2021 Sheehy ................. F21V 23/002

FOREIGN PATENT DOCUMENTS

EP 2128516 A2 * 12/2009 .............. F21S 8/043

* cited by examiner

*Primary Examiner* — Leah Simone Macchiarolo
(74) *Attorney, Agent, or Firm* — Best & Flanagan LLP

(57) ABSTRACT

A connection structure of an (light-emitting diode) LED wall lamp having a hidden switch contains: a fixer, a rotatable sleeve, a coupling ring, a lampshade, a connection seat, a LED light module, and a decoration element. The fixer includes multiple positioning orifices and a through orifice. The rotatable sleeve is configured to be rotatably connected with the coupling ring and includes a connecting shaft, a locating post, and a rotary section. The coupling ring is configured to connect the lampshade, the connection seat and the decoration element. The lampshade includes a circular platform and multiple threaded orifices. The connection seat is configured to connect the LED light module. The LED light module is configured to illuminate lights and includes multiple LED units and a switch built in the LED light module. The decoration element is mounted on the coupling ring to cover a central orifice of the circular disc.

4 Claims, 7 Drawing Sheets

CONNECTION STRUCTURE OF LED WALL LAMP HAVING HIDDEN SWITCH

TECHNICAL FIELD

The present invention relates to a wall lamp, and more particularly to a connection structure which an LED wall lamp having a hidden switch to obtain quick and easy assembly.

BACKGROUND

A conventional wall lamp is applied to enhance brightness, but it has defects as follows:

Referring to FIG. 1, a power cable 20 of a conventional wall lamp 10 is electrically connected outside a socket, and a switch 30 is fixed on the wall lamp 10, thus causing complicated and time-consuming assembly.

The switch 30 is exposed outside the wall lamp to be touched by children easily.

Also, the switch 30 is electrically connected with the power cable 20 and is exposed outside the wall lamp, thus having strangulation of the children by the power cable.

The present invention has arisen to mitigate and/or obviate the afore-described disadvantages.

SUMMARY

The primary aspect of the present invention is to provide a connection structure of an LED wall lamp by which it is not required to consider a fixing direction of the power cable in assembly, thus obtaining quick and easy assembly.

Further aspect of the present invention is to provide a connection structure of an LED wall lamp by which the switch is built in the LED light module to avoid being touched by the children.

Another aspect of the present invention is to provide a connection structure of an LED wall lamp by which the switch is built in the LED light module to avoid strangulation of the children by the power cable.

To obtain above-mentioned aspect, a connection structure of an LED wall lamp provided by the present invention contains: a fixer, a rotatable sleeve, a coupling ring, a lampshade, a connection seat, a LED light module, and a decoration element.

The fixer includes multiple positioning orifices is configured to receive multiple first screws so as to fix the fixer on a plane, and the fixer further includes a through orifice.

The rotatable sleeve is hollow and is configured to be rotatably connected with the coupling ring, and the rotatable sleeve includes a connecting shaft, a locating post, and a rotary section. The connecting shaft is disposed on a side of the locating post, and the locating post is configured to be connected with the connection shaft via the through orifice by using a screw nut and a washer so that the rotatable sleeve is fixed on the fixer. The locating post is configured to be rotatably connected with the rotary section so that the rotary section is rotated along the locating post.

The coupling ring is configured to connect the lampshade, the connection seat and the decoration element, and the coupling ring includes a circular disc and a joining column. The circular disc has multiple passing orifices; the joining column is connected on a peripheral side of the circular disc and is rotatably connected with the rotary section. The rotary section is screwed with the joining column so as to adjust a rotating angle of the rotatable sleeve by using the coupling ring.

The lampshade is formed in an inverted funnel shape, and the lampshade includes a circular platform and multiple threaded orifices defined on the circular platform, such that multiple second screws are configured to screw the coupling ring with the lampshade after being inserted through and screwed with the multiple passing orifices and the multiple threaded orifices of the circular platform.

The connection seat is configured to connect the LED light module, and the connection seat is in a U shape and is screwed on the circular platform by using multiple third screws. The connection seat includes two extensions extending outward from two sides thereof, and multiple fourth screws are configured to screw the two extensions with the LED light module, thus connecting the connection seat with the LED light module.

The LED light module is configured to illuminate lights, and the LED light module includes multiple LED units and a switch built in the LED light module and configured to be pressed to turn on/off the multiple LED units.

The decoration element is cylindrical and is mounted on a top of the coupling ring to cover a central orifice of the circular disc.

Thereby the LED light module, the connection seat, the lampshade, the coupling ring, the rotatable sleeve, the fixer and the decoration element are connected in turns. Preferably, the switch is built in the LED light module, thus obtaining easy assembly and preventing a touch of the switch by children.

DETAILED DESCRIPTION

Figure 1:
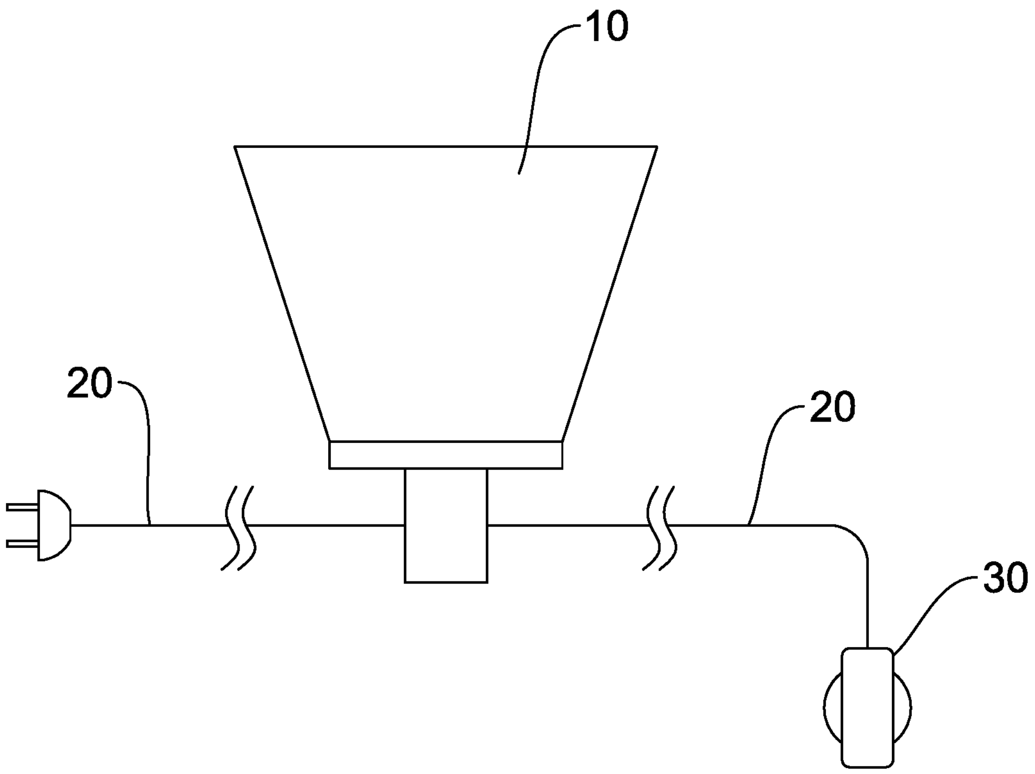
PRIOR ART FIG.1
FIG. 1 is a schematic view of a conventional wall lamp.
Figure 2:
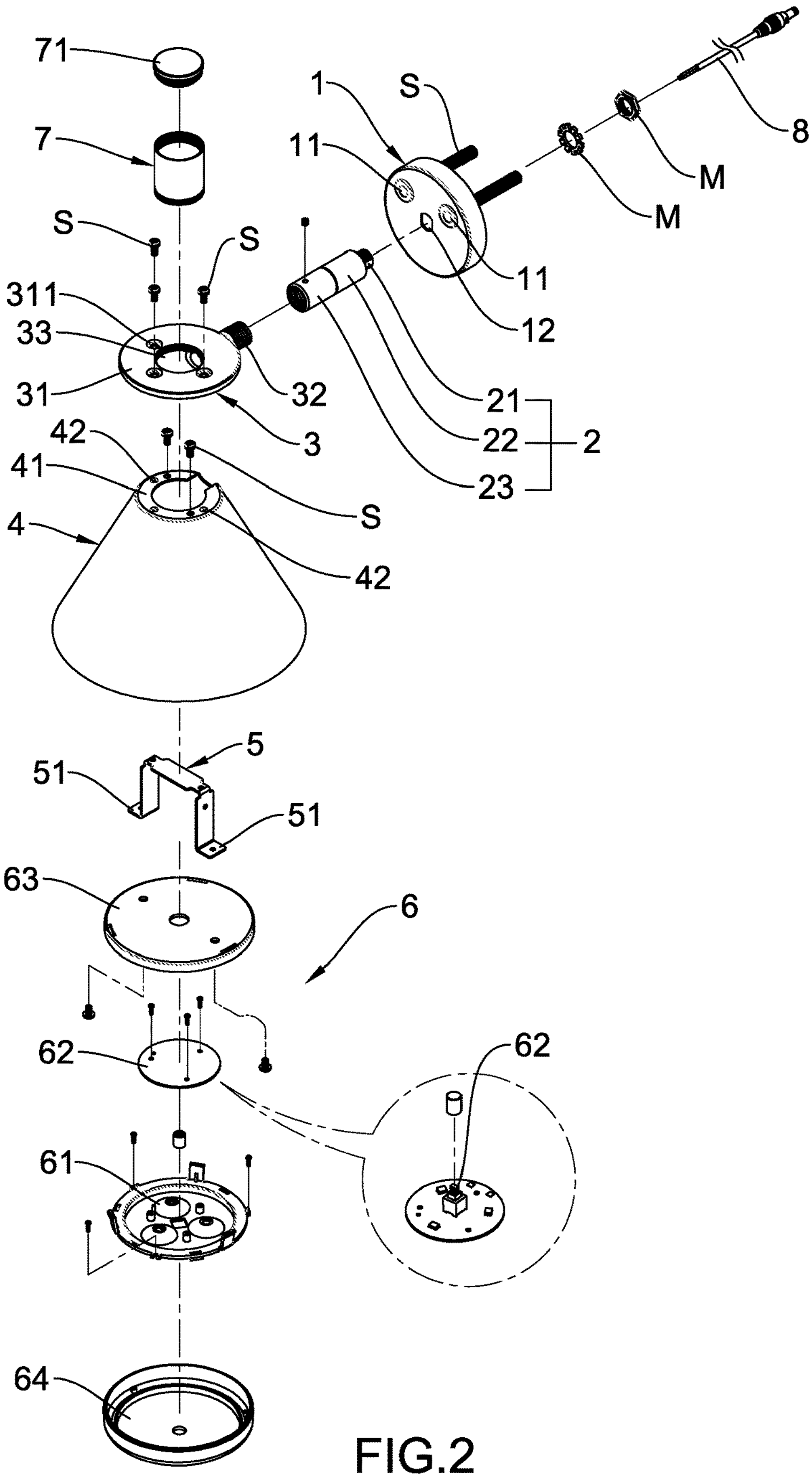
FIG. 2 is a perspective view showing the exploded components of a connection structure of an LED wall lamp according to a preferred embodiment of the present invention.

With reference to FIGS. 1-2, a connection structure of an (light-emitting diode) LED wall lamp having a hidden switch according to a preferred embodiment of the present invention comprises: a fixer 1, a rotatable sleeve 2, a coupling ring 3, a lampshade 4, a connection seat 5, a LED light module 6, and a decoration element 7.

Referring to FIG. 1, the fixer 1 includes two positioning orifices 11 configured to receive two first screws S so as to fix the fixer 1 on a plane (not shown), and the fixer 1 further includes a through orifice 12.

Figure 3:
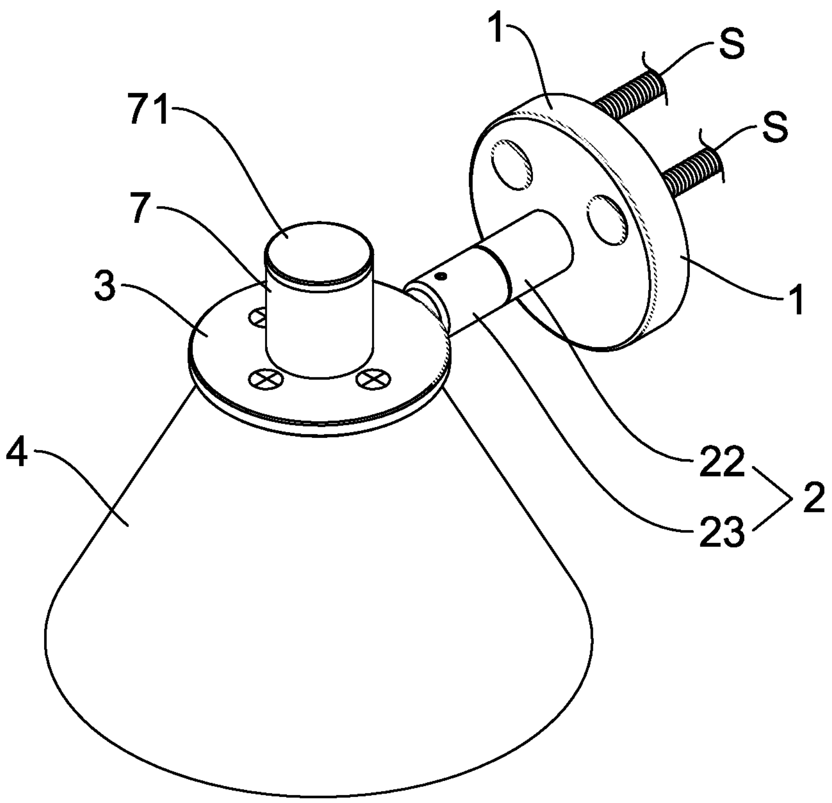
FIG. 3 is a perspective view showing the assembly of the connection structure of the LED wall lamp according to the preferred embodiment of the present invention.
Figure 4:
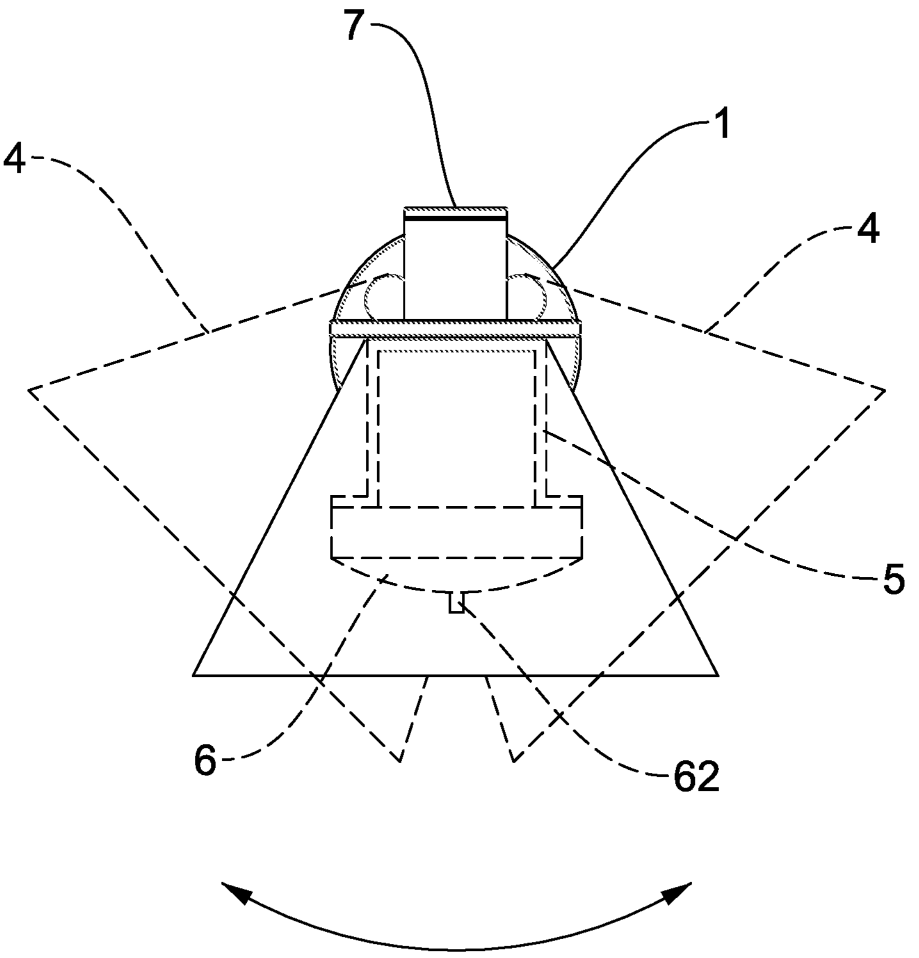
FIG. 4 is a side plane view showing the operation of the connection structure of the LED wall lamp according to the preferred embodiment of the present invention.
Figure 5:
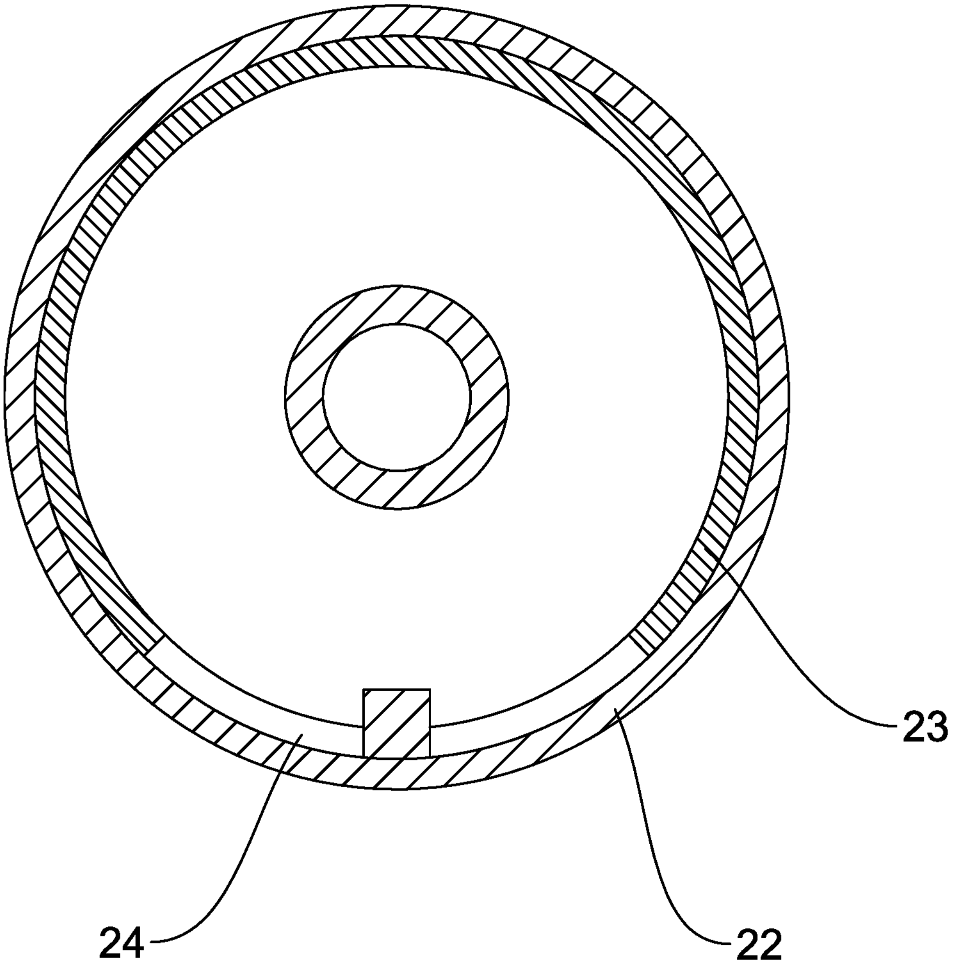
FIG. 5 is a cross sectional view showing the assembly of the limitation portion of the connection structure of the LED wall lamp according to the preferred embodiment of the present invention.
Figure 6:
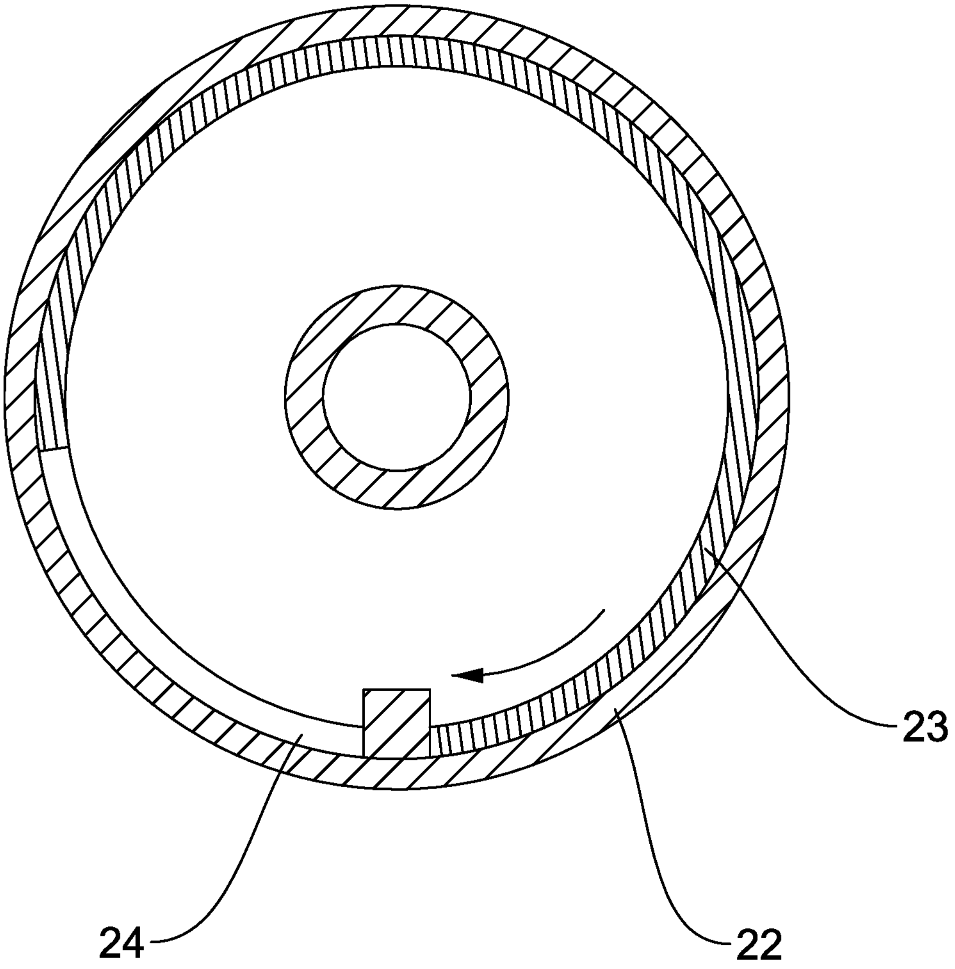
FIG. 6 is a cross sectional view showing the operation of the rotatable sleeve of the connection structure of the LED wall lamp according to the preferred embodiment of the present invention.
Figure 7:
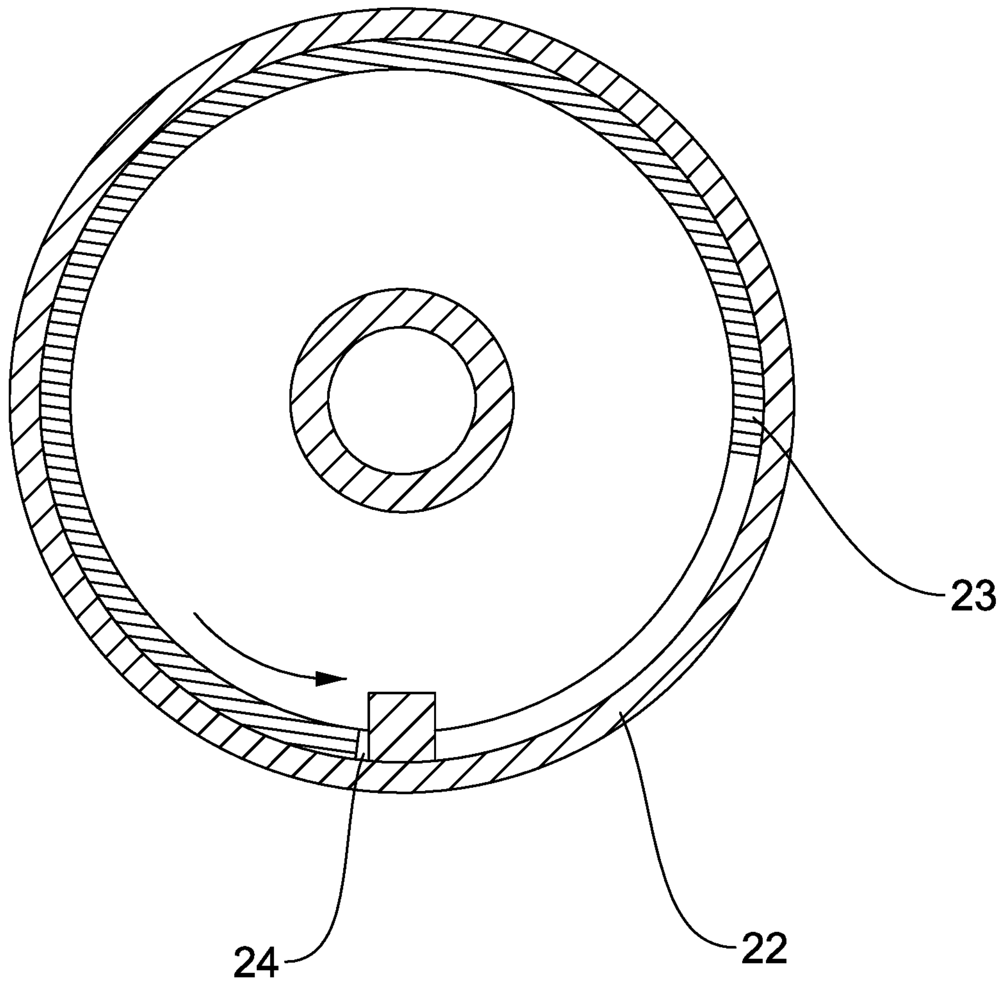
FIG. 7 is another cross sectional view showing the operation of the rotatable sleeve of the connection structure of the LED wall lamp according to the preferred embodiment of the present invention.

As shown in FIGS. 1 and 2, the rotatable sleeve 2 is hollow and is configured to be rotatably connected with the coupling ring 3, the rotatable sleeve 2 includes a connecting shaft 21, a locating post 22, and a rotary section 23, wherein the connecting shaft 21 is rotatably disposed on a side of the locating post 22, the locating post 22 is configured to be connected with the connection shaft 21 via the through orifice 12 by using a screw nut and a washer so that the rotatable sleeve 2 is fixed on the fixer 1. The locating post 22 is configured to be rotatably connected with the rotary section 23 so that the rotary section 23 is rotated along the locating post 22, as illustrated in FIGS. 3 and 4, wherein a limitation portion 24 is defined between the rotary section 23 and the locating post 22 of the rotatable sleeve 2 and is configured to limit a rotation of the rotatable sleeve 2 within an angular range. With reference to FIG. 5, the limitation portion 24 limits the rotation of the rotatable sleeve 2, when the rotatable sleeve 2 is rotated clockwise. Referring to FIG. 6, the limitation portion 24 limits the rotation of the rotatable sleeve 2, when the rotatable sleeve 2 is rotated counterclockwise.

As shown in FIGS. 1 and 2, the coupling ring 3 is configured to connect the lampshade 4, the connection seat 5 and the decoration element 7. The coupling ring 3 includes a circular disc 31 and a joining column 32, and the circular disc 3 has multiple passing orifices 311. The joining column 32 is connected on a peripheral side of the circular disc 31 and is rotatably connected with the rotary section 23, as shown in FIG. 1, wherein the rotary section 23 is screwed with the joining column 32 so as to adjust a rotating angle of the rotatable sleeve 2 by using the coupling ring 3.

With reference to FIGS. 1 to 3, the lampshade 4 is formed in an inverted funnel shape, and the lampshade 4 includes a circular platform 41 and multiple threaded orifices 42 defined on the circular platform 41, such that multiple second screws S are configured to screw the coupling ring 3 with the lampshade 4 after being inserted through and screwed with the multiple passing orifices 311 and the multiple threaded orifices 42 of the circular platform 41.

Referring to FIG. 1, the connection seat 5 is configured to connect the LED light module 6, wherein the connection seat 5 is in a U shape and is screwed on the circular platform 41 by using multiple third screws S, the connection seat 5 includes two extensions 51 extending outward from two sides thereof, and multiple fourth screws S are configured to screw the two extensions 51 with the LED light module 6, thus connecting the connection seat 5 with the LED light module 6.

As shown in FIG. 1, the LED light module 6 is configured to illuminate lights, and the LED light module 6 includes multiple LED units 61 and a switch 62 connected on the LED light module 6. In this embodiment, the LED light module 6 further includes a base 63 configured to be connected with the connection seat 5, and a plastic cap 64 configured to shield the multiple LED units 61. Preferably, the switch 62 is built in the LED light module 6 so as to be pressed to turn on/off the multiple LED units 61.

Referring to FIG. 1, the decoration element 7 is cylindrical. In this embodiment, the decoration element 7 includes a lid 71 covered on a top thereof, wherein the decoration element 7 is mounted on a top of the coupling ring 3 to cover a central orifice 33 of the circular disc 31.

As illustrated in FIGS. 1 and 2, in assembly, the LED light module 6, the connection seat 5, the lampshade 4, the coupling ring 3, the rotatable sleeve 2, the fixer 1 and the decoration element 7 are connected in turns, wherein the switch 62 is built in the LED light module 6, thus obtaining easy assembly and preventing a touch of the switch by children.

With reference to FIG. 1, the LED light muddle 6 is electrically connected with a power cable 8 so as to supply power to the multiple LED units 61. The power cable 8 is electrically connected with the LED light module 6 after being inserted through the fixer 1, the rotatable sleeve 2, and the central orifice 33 of the coupling ring 3.

Thereby, the advantages of the connection structure of the LED wall lamp contain:

1) In assembly, it is not required to consider a fixing direction of the power cable 8, thus obtaining quick and easy assembly.
2) The switch 62 is built in the LED light module 6 to avoid being touched by the children.
3) The switch 62 is built in the LED light module 6 to avoid strangulation of the children by the power cable 8.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A connection structure of an (light-emitting diode) LED wall lamp having a hidden switch comprising: a fixer, a rotatable sleeve, a coupling ring, a lampshade, a connection seat, a LED light module, and a decoration element;

wherein the fixer includes multiple positioning orifices configured to receive multiple first screws so as to fix the fixer on a plane, and the fixer further includes a through orifice;

wherein the rotatable sleeve is hollow and is configured to be rotatably connected with the coupling ring, the rotatable sleeve includes a connecting shaft, a locating post, and a rotary section, wherein the connecting shaft is disposed on a side of the locating post, the locating post is configured to be connected with the connection shaft via the through orifice by using a screw nut and a washer so that the rotatable sleeve is fixed on the fixer; wherein the locating post is configured to be rotatably connected with the rotary section so that the rotary section is rotated along the locating post;

wherein the coupling ring is configured to connect the lampshade, the connection seat and the decoration element, and the coupling ring includes a circular disc and a joining column, wherein the circular disc has multiple passing orifices; the joining column is connected on a peripheral side of the circular disc and is rotatably connected with the rotary section, wherein the rotary section is screwed with the joining column so as to adjust a rotating angle of the rotatable sleeve by using the coupling ring;

wherein the lampshade is formed in an inverted funnel shape, and the lampshade includes a circular platform and multiple threaded orifices defined on the circular platform, such that multiple second screws are configured to screw the coupling ring with the lampshade after being inserted through and screwed with the multiple passing orifices and the multiple threaded orifices of the circular platform;

wherein the connection seat is configured to connect the LED light module, and the connection seat is in a U shape and is screwed on the circular platform by using multiple third screws, the connection seat includes two extensions extending outward from two sides thereof, and multiple fourth screws are configured to screw the two extensions with the LED light module, thus connecting the connection seat with the LED light module;

wherein the LED light module is configured to illuminate lights, and the LED light module includes multiple LED units and a switch built in the LED light module and configured to be pressed to turn on/off the multiple LED units;

wherein the decoration element is cylindrical and is mounted on a top of the coupling ring to cover a central orifice of the circular disc;

thereby the LED light module, the connection seat, the lampshade, the coupling ring, the rotatable sleeve, the fixer and the decoration element are connected in turns, wherein the switch is built in the LED light module, thus obtaining easy assembly and preventing a touch of the switch by children.

2. The connection structure as claimed in claim 1, wherein the LED light module is electrically connected with a power cable so as to supply power to the multiple LED units.

3. The connection structure as claimed in claim 2, wherein the power cable is electrically connected with the LED light module after being inserted through the fixer, the rotatable sleeve, and the central orifice of the coupling ring.

4. The connection structure as claimed in claim 1, wherein a limitation portion is defined between the rotary section and the locating post of the rotatable sleeve and is configured to limit a rotation of the rotatable sleeve within an angular range.

* * * * *